W. SPARKS.
CUTTING TOOL.
APPLICATION FILED JULY 27, 1910.
1,219,677.
Patented Mar. 20, 1917.
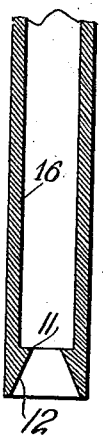 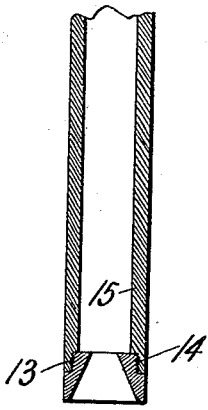 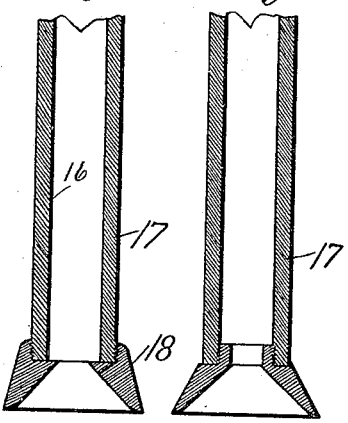
 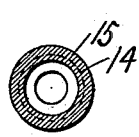 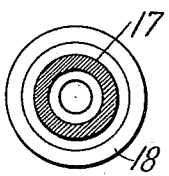 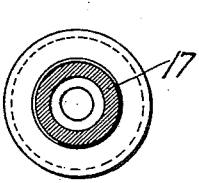
Witnesses:
Louise Enderle
Any P. Jurgensen
Walter Sparks, Inventor
By his Attorney

UNITED STATES PATENT OFFICE.

WALTER SPARKS, OF NEW YORK, N. Y.

CUTTING-TOOL.

1,219,677.  Specification of Letters Patent.  Patented Mar. 20, 1917.

Application filed July 27, 1910. Serial No. 574,194.

*To all whom it may concern:*

Be it known that I, WALTER SPARKS, a citizen of the United States, residing at 615 West One Hundred and Forty-third street, New York, in the county of New York and State of New York, have invented certain new and useful Improvements in Cutting-Tools, of which the following is a specification, reference being had therein to the accompanying drawing.

My invention relates to improvements in tools adapted for cutting paper or like substances, and more particularly, it has reference to a tool adapted for use as a punch or drill for perforating material such as paper. This drill or punch is substantially tubular and is intended to be rotated and fed downwardly by a machine such as a drill press.

In the accompanying drawings, Figure 1 is a vertical sectional illustration partly broken away illustrating one form of my invention and showing the tool formed of a single piece of metal. Fig. 2 is a transverse section of the same. Fig. 3 is a longitudinal section of a modification of the invention showing the tool constructed in two parts. Fig. 4 is a cross section of the same; Fig. 5 a longitudinal section illustrating another modification of the invention; Fig. 6 a cross section of the same, Fig. 7 a longitudinal section illustrating a modification of Fig. 5 and Fig. 8 a cross section of the same. The drawings are enlarged and the tapers or flares are exaggerated for purposes of clearness.

The tool may be secured in the chuck of an ordinary drill press and in the form shown in Fig. 1 is preferably constructed by enlarging part of the bore of a tube leaving a projection or ledge 11 and by tapering or flaring one end of the bore of the tube forming the beveled cutter 12. In Fig. 3 one end of this tube is screw-threaded on the inside as shown at 13 and the beveled cutter is made separately and screw threaded on the periphery as shown at 14 so as to engage the inner threads of the tube 15.

The separate beveled cutter may be screwed into the end of the tubular portion or shank of the drill as shown in Fig. 3 and the internal bore 16 of the beveled cutter, whether the beveled cutter is separate or integral may be of less diameter than the internal diameter of the tubular portion or shank of the drill thereby providing a projection or ledge as shown at 11 in Fig. 1, thus forming an abrupt shoulder to utilize the elasticity of the paper disks by (first) gradually contracting and compressing them and (second) then abruptly releasing them allowing them to expand and spring apart so as to readily escape through the bore or shank of the drill.

The tool may also be made with an external taper 18 to the beveled cutter as shown in Fig. 5 and in that case the screw threads may be cut on the outside of the tube 17 as shown in Fig. 5. From this arrangement it will be observed that the tool may be made interchangeable for cutting holes of various diameters by unscrewing the beveled cutter from the shank of the tool and substituting a different sized beveled cutter provided with similar screw threads without changing the entire tool. The internal diameter 16 of the cutter is in all cases preferably less than the smallest internal diameter of the discharge passage of the tool thereby providing a free discharge for the cuttings.

Various modifications may be made without departing from the spirit of the invention as set forth in the claims.

I claim:

1. A tool of the class described having a cylindrical body portion terminating in a beveled cutter at one end, said cutter providing a shoulder at the base of said body portion on the inside, and the outside of said body portion of substantially uniform diameter.

2. A tool of the class described having a cylindrical body portion terminating in a beveled cutter at one end, said cutter providing a shoulder at the base of said body portion on the inside, and the outside of said body portion of substantially uniform diameter, and the internal bore of said tool of substantially uniform diameter.

In testimony whereof I affix my signature in presence of two witnesses.

WALTER SPARKS.

Witnesses:
W. M. GILDERSLEVE,
RICH WELLWINKLE.

Copies of this patent may be obtained for five cents each, by addressing the "Commissioner of Patents, Washington, D. C."